Sept. 17, 1940.  R. W. WEEKS  2,215,413
SELF-REGULATING WIND MOTOR
Filed Aug. 24, 1937
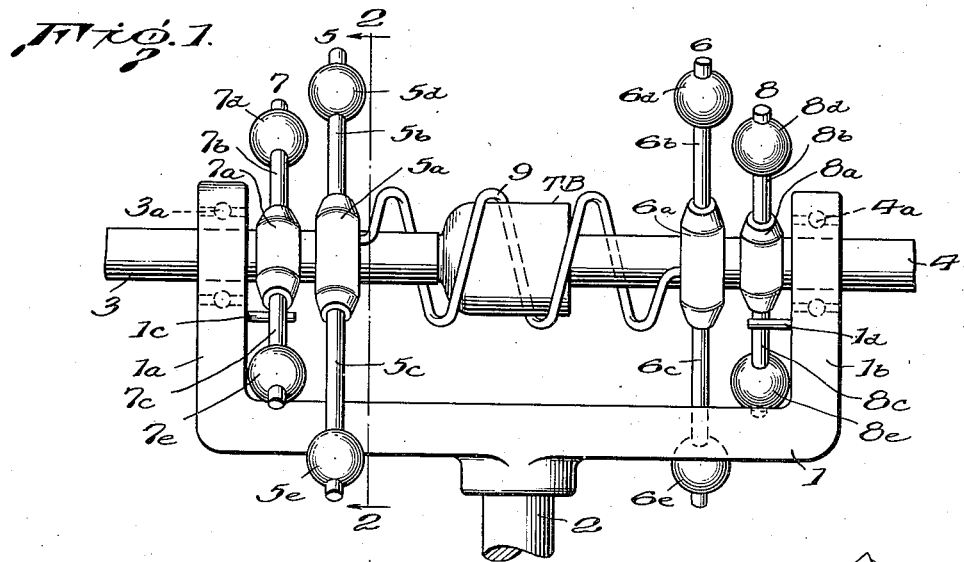
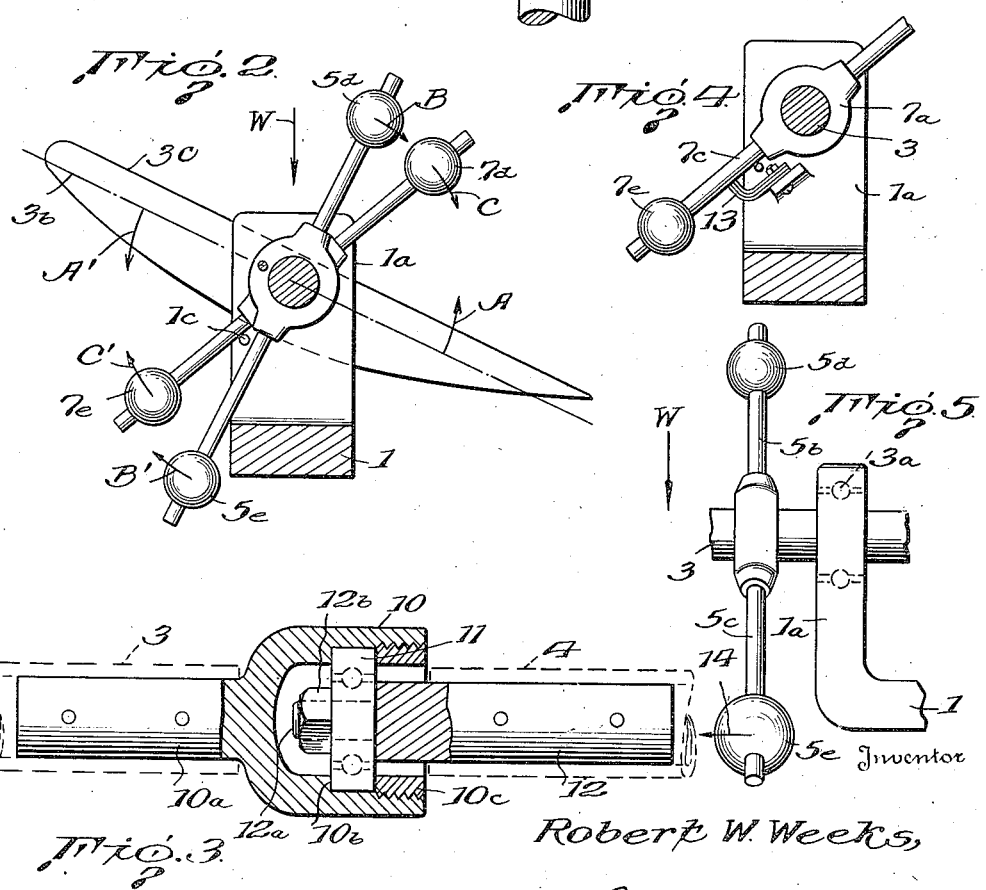
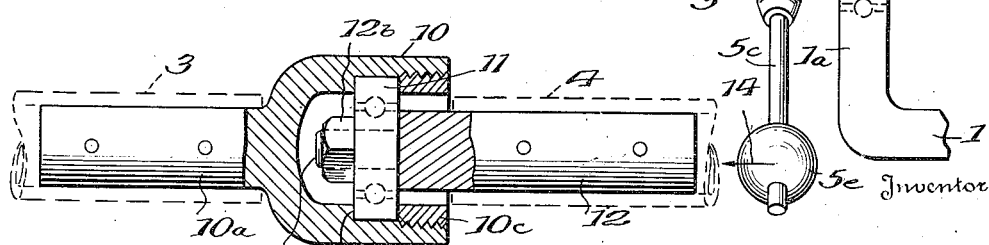
Robert W. Weeks,
By Ralph B. Stewart
Attorney Patented Sept. 17, 1940

2,215,413

UNITED STATES PATENT OFFICE 2,215,413

SELF-REGULATING WIND MOTOR

Robert W. Weeks, West Chester, Pa.

Application August 24, 1937, Serial No. 160,707

8 Claims. (Cl. 170—68)

This invention relates to wind turbines and may be applied either to wind motors for deriving power from the wind or to wind impellers for converting power into wind flow.

The object of the present invention is to devise an arrangement for automatically changing the pitch or angle of attack of the blades of a wind turbine in accordance with the speed of the turbine. According to my invention, I mount the blades of a wind turbine upon a rotatable hub so the blades may be turned about their longitudinal axes, and provide eccentric or governor weights secured to the blades in a manner such that the weights serve to regulate the pitch of the blades in accordance with the speed of the turbine.

A preferred embodiment of my invention is illustrated in the accompanying drawing, in which:

Figure 1 is a fragmentary view showing the rotatable yoke or hub with the neutralizing and governor weights mounted on the blade shafts;

Figure 2 is a sectional view taken along the line 2—2 of Figure 1;

Figure 3 is a fragmentary view on an enlarged scale illustrating the detail of construction of the thrust bearing located between the ends of the blade shafts;

Figure 4 is a fragmentary view showing the details of a buffer spring arrangement; and Figure 5 is a fragmentary view showing a modified arrangement of neutralizing weights.

Referring to the drawing, I indicates a rotatable hub or yoke mounted upon the shaft 2. It is to be understood that the shaft 2 is mounted for rotation upon a horizontal axis and is carried by the usual tower head located at the top of the tower and arranged for rotation about a vertical axis in order to keep the turbine facing into the wind. Two propeller blades having shafts 3 and 4 are mounted in axial alignment upon the hub 1, the shaft 3 being journalled by ball-bearings 3a in the arm 1a of yoke 1 and the shaft 4 being journalled by ball-bearings 4a in the arm 1b. The blades are not shown in Figure 1, but the blade on shaft 3 is shown at 3c in Figure 2. The inner ends of shafts 3 and 4 are joined together by a thrust bearing TB, the details of which are shown in Figure 3. Mounted upon shaft 3 is a neutralizing weight 5 consisting of a collar 5a secured to the shaft and provided with oppositely extending arms 5b and 5c, on which are adjustably mounted two adjusted weights 5d and 5e. A similar neutralizing weight 6 is secured to shaft 4 and consists of a collar 6a provided with arms 6b and 6c carrying adjusted weights 6d and 6e. The neutralizing weight 5 mounted on arm 3 is arranged substantially at right angles to the plane of the front blade at its center of gravity, as shown in Figure 2. Neutralizing weight 6 is also preferably arranged at right angles to the front plane of the blade carried by shaft 4. Neutralizing weights 5 and 6 are designed to neutralize or counter-balance the tendency of the blades to twist about the axis of shafts 3 and 4, as will be explained hereinafter.

A governor weight 7 is secured to shaft 3 and consists of a collar 7a secured to the shaft and provided with oppositely extending arms 7b and 7c carrying adjusted weights 7d and 7e, respectively. A similar governor weight 8 is mounted upon shaft 4 and consists of a collar 8a secured to the shaft and provided with oppositely extending arms 8b and 8c carrying adjusted weights 8d and 8e. It will be understood that the collar elements of weights 5, 6, 7 and 8 are secured to shafts 3 or 4 by suitable means such as set-screws (preferably of the headless type) or by bolts. They may be arranged for adjustment, more particularly the governor weights 7 and 8. Also, weights 5d, 5e, 6d, 6e, 7d, 7e, 8d and 8e are preferably adjustable along the axes of the supporting arms, although these weights may be made integral with the arms if desired. A composite arm may be used with two sets of weights comprising both a neutralizing and governor weight all in place of two arms.

Surrounding the inner ends of shafts 3 and 4 is a helical spring 9, one end being secured to the shaft 3 as by engagement in a socket in the collar 5a and the other end being secured to shaft 4 as by engagement in the socket in collar 6a. The spring 9 is normally under tension and tends to twist shafts 3 and 4 in opposite directions.

The details of the thrust bearing TB are shown on an enlarged scale in Fig. 3. This bearing consists of a cup shaped member 10 having a stub shaft 10a secured in the hollow end of blade-shaft 3. A ball-bearing unit 11, preferably of the grease-sealed type, is mounted in cup element 10 on the shoulder 10b and is secured in position within the cup 10 by means of a threaded sleeve 10c screwed in the threaded end of cup 10. A stub shaft 12 is secured in the hollow end of blade-shaft 4 and is provided with a reduced threaded extension 12a which extends through the center opening in the ball-bearing unit 11 and is secured to the inner rotatable part of the unit by means of a nut 12b. The ball-bearing unit 11 is so constructed that it takes up the thrust exerted axially along shafts 3 and 4 by reason of the centrifugal action of the weight of the blades, while at the same time permitting the blades to freely rotate with respect to each other about their axes in order to vary the pitch of the blades. The stub shafts 10a and 12 may be secured to the shafts 3 and 4 in any suitable manner, as by riveting or bolting. The bolting may be arranged so that the same bolts secure the weight arms along with the blade arms. The inner ends of shafts 3 and 4 are shown in dotted lines in Figure 3.

Referring to Figure 2, the blade associated with shaft 3 is shown in outline at 3b, and the direction of the wind impinging upon the blade is indicated by the arrow W. The spring 9 normally tends to hold the blade 3b at a relatively large angle with respect to the direction of the wind (see arrow W), and stop-pin 1c mounted in the arm 1a of hub 1 and cooperating with the arm 7c serves to limit the movement of the blade against the action of spring 9. A similar stop-pin 1d mounted in arm 1b and cooperating with arm 8c serves to hold the blade associated with shaft 4 in the same relative position as the blade 3b shown in Figure 2. As the hub 1 rotates about the axis of shaft 2, the blade 3b tends to twist into the plane of rotation as indicated by the arrows A and A'. This twisting action is due to centrifugal forces developed by the mass of the blade, since the plane of the blade is located in a plane at an angle to the plane of rotation, and the forces tend to shift these masses into a common plane of rotation. In a similar manner, since the weights 5d and 5e do not rotate in the plane of rotation of shaft 3, centrifugal forces are exerted by these weights in the directions indicated by the arrows B and B' tending to swing these weights into a common plane of rotation with shaft 3 and thereby tending to twist the shaft 3 in an opposite direction to the forces A and A' exerted by the masses of the blade 3b. As explained above, the neutralizing weight 5 is designed so that the forces B and B' will counter-balance the forces A and A' tending to twist the blade out of its normal position.

The action of governor weights 7d and 7e establishes forces tending to twist the blade 3a in the opposite direction from that of spring 9, as indicated by the arrows C and C' in Figure 2. At a predetermined speed of the motor, the action of governor weights 7d and 7e will counter-balance the force of spring 9, and the blade 3c will remain in normal position without any appreciable pressure against the stop-pin 1c. In case the wind velocity should increase and speed up the motor, the action of the governor weight 7 would be such as to twist the blade in the direction indicated by arrows C and C' and thereby reduce the angle between the face of the blade and the direction of flow of the wind as shown by the arrow W. This change in angle of the blade with respect to the wind will reduce the tendency of the blade to speed up, and automatic regulation of the speed of the motor is thereby secured. In a like manner, if the motor is operating within the regulating range and the wind velocity should decrease, the force exerted by the governor weight 7 will decrease and the spring 9 will turn the blade to a greater angle to the wind and thereby tend to maintain the speed of the motor.

It will be understood that the action of the governor weights 8c and 8d, and of spring 9, upon the blade of shaft 4 is the same as described above for the blade of shaft 3, except that the shaft 4 rotates in an opposite direction from shaft 3. It will be noted that a single spring 9 is employed for controlling the regulating action on both blades, and no special means is required for equalizing the regulating movement of the two blades.

A further advange of the construction shown and described resides in the fact that the thrust bearing TB joining the abutting end of shafts 3 and 4 serves to take up the radial thrust exerted along the axes of these shafts by centrifugal action of the blades, and since these radial forces are not applied to the arms of the yoke 1, the yoke may be formed of rather light construction. It should be understood that bearings 3a and 4a will take up any unbalance in the radial pull exerted along the axes of shafts 3 and 4 and will maintain the two shafts centered with respect to the yoke or hub 1.

By providing neutralizing weights 5 and 6 to counterbalance the twisting forces developed by the blade masses, the governor weights 7 and 8 are only required to overcome the force exerted by spring 9, and this construction greatly facilitates the proper design and adjustment of the regulating arrangement. It will be understood that the various weights 5, 6, 7 and 8 need not be formed with two arms as shown, but only one arm with its associated weight may be employed if desired, or a composite arm each with one neutralizing and one governor weight, may be used.

Under certain conditions, the restoring action of spring 9 will cause the weight arms to hit against stop pins 1c and 1d with considerable force, and, in order to prevent damage by this impact, a buffer spring 13 may be arranged to cooperate with each arm as shown in Figure 4. The spring is preferably formed of two or more leaf springs supported on the arms of yoke 1 and arranged to engage the weight arms in succession as the arm approaches the stop pin, thereby offering increasing buffering action to the arm.

The neutralizing weights may be arranged on the outside of yoke or hub 1 as shown in Figure 5, if desired. Also, in order to neutralize the action of the wind tending to rotate the shaft 3 about bearing 3a, the trailing weight 5e may be made larger than the leading weight 5d. Due to the difference between these two weights, a resultant centrifugal force indicated by the arrow 14 in Fig. 5 will tend to rotate the shaft 3 in a clockwise direction in bearing 3a, while the wind pressure indicated by the arrow W tends to rotate the shaft in the opposite direction. By properly selecting the two weights it will be possible to substantially neutralize the bending action of the wind on the blade shaft at the normal speed of the motor. It will be understood that the centrifugal action of the two blades acting on the bearing TB tends to keep the two blades in alignment.

What I claim is:

1. A wind turbine comprising a rotatable hub, a pair of variable pitch blades having supporting shafts journalled on opposite sides of said hub in axial alignment with each other, the ends of said supporting shafts being arranged in abutting relation, a single helical spring surrounding the abutting ends of the supporting shafts of said blades, said spring being connected to said shafts and arranged to bias said shafts in opposite directions and to normally maintain said blades at a predetermined pitch, and centrifugal means acting upon each blade tending to turn each blade in a direction opposing the action of said spring.

2. A wind turbine comprising a rotatable hub, a pair of variable pitch blades having supporting shafts journalled on opposite sides of said hub in axial alignment with each other, the ends of said supporting shafts being arranged in abutting relation, a single helical spring surrounding the abutting ends of the supporting shafts of said blades, said spring being connected to said shafts and arranged to bias said shafts in opposite directions, stop elements to normally maintain said blades at a predetermined pitch, and buffer springs for preventing sudden impact of said blades on said stops, and centrifugal means acting upon each blade tending to turn each blade in a direction opposing the action of said spring.

3. A wind turbine comprising a rotatable hub, a pair of variable pitch blades having supporting shafts journalled on opposite sides of said hub in axial alignment with each other, the ends of said supporting shafts being arranged in abutting relation, a thrust bearing joining the abutting ends of the supporting shafts of said blades for relieving said hub of the radial forces developed by centrifugal action of said blades, a single helical spring surrounding said bearing and the abutting ends of the supporting shafts of said blades, said spring being connected to said shafts and arranged to bias said shafts in opposite directions and to normally maintain said blades at a predetermined pitch, and centrifugal means acting upon each blade tending to turn each blade in a direction opposing the action of said spring.

4. A wind turbine comprising a rotatable hub, a pair of variable pitch blades having supporting shafts journalled on opposite sides of said hub in axial alignment with each other, the ends of said supporting shafts being arranged in abutting relation, a single helical spring surrounding the abutting ends of the supporting shafts of said blades, said spring being connected to said shafts and arranged to bias said shafts in opposite directions and to normally maintain said blades at a predetermined pitch, a neutralizing weight secured to each blade for counter balancing the forces of the masses of said blade tending to move the plane of said blade parallel to the plane of rotation, and centrifugal means acting upon each blade tending to turn each blade in a direction opposing the action of said spring.

5. A wind turbine comprising a rotatable hub, a pair of variable pitch blades having supporting shafts journalled on opposite sides of said hub in axial alignment with each other, the ends of said supporting shafts being arranged in abutting relation, a single helical spring surrounding the abutting ends of the supporting shafts of said blades, said spring being connected to said shafts and arranged to bias said shafts in opposite directions and to normally maintain said blades at a predetermined pitch, and centrifugally operated means for varying the pitch of said blades in accordance with the speed of rotation of said hub.

6. A wind turbine comprising a rotatable hub, a pair of variable pitch blades having supporting shafts journalled on opposite sides of said hub in axial alignment with each other, the ends of said supporting shafts being arranged in abutting relation, a single helical spring surrounding the abutting ends of the supporting shafts of said blades, said spring being connected to said shafts and arranged to bias said shafts in opposite directions and to normally maintain said blades at a predetermined pitch, a neutralizing weight secured to each blade for counter balancing the forces of the masses of said blade tending to move the plane of said blade parallel to the plane of rotation, and centrifugally operated means for varying the pitch of said blades in accordance with the speed of rotation of said hub.

7. A wind turbine comprising a rotatable hub, a pair of variable pitch blades having supporting shafts journalled on opposite sides of said hub in axial alignment with each other, a thrust bearing joining the abutting ends of the supporting shafts of said blades for relieving said hub of the radial forces developed by centrifugal action of said blades, a single helical spring surrounding said bearing and the abutting ends of the supporting shafts of said blades, said spring being connected to said shafts and arranged to bias said shafts in opposite directions and to normally maintain said blades at a predetermined pitch, and means secured to each shaft for varying the pitch of said blades in accordance with the speed of rotation of said hub.

8. A wind turbine comprising a rotatable hub, a pair of variable pitch blades having supporting shafts journalled on opposite sides of said hub in axial alignment with each other, a thrust bearing joining the abutting ends of the supporting shafts of said blades for relieving said hub of the radial forces developed by centrifugal action of said blades, a single helical spring surrounding said bearing and the abutting ends of the supporting shafts of said blades, said spring being connected to said shafts and arranged to bias said shafts in opposite directions and to normally maintain said blades at a predetermined pitch, a neutralizing weight secured to each blade for counter balancing the forces of the masses of said blade tending to move the plane of said blade parallel to the plane of rotation, and means secured to each shaft for varying the pitch of said blades in accordance with the speed of rotation of said hub.

ROBERT W. WEEKS.